United States Patent [19]

Bartholomew

[11] 3,856,145

[45] Dec. 24, 1974

[54] RECORD STORAGE RACK

[75] Inventor: Allan E. Bartholomew, North Canton, Ohio

[73] Assignee: Myers Industries, Inc., Akron, Ohio

[22] Filed: Jan. 22, 1974

[21] Appl. No.: 435,479

[52] U.S. Cl. .................................... 211/40, 312/10
[51] Int. Cl. ........................................... A47g 29/00
[58] Field of Search ........... 312/9, 10, 13, 108, 111; 211/40, 41, 50, 177

[56] References Cited

UNITED STATES PATENTS

| | | | |
|---|---|---|---|
| 1,336,382 | 4/1920 | Schlingloff | 312/13 |
| 3,514,170 | 5/1970 | Shewchuk | 312/111 X |
| 3,635,350 | 1/1972 | Wolf | 211/40 |
| 3,759,395 | 9/1973 | Tuhlin | 211/40 |

*Primary Examiner*—James C. Mitchell
*Attorney, Agent, or Firm*—Oldham & Oldham Co.

[57] ABSTRACT

A record storage rack including a pair of members each with an end beveled at a 45° angle and complementary shaped slidably engaging securing means on the beveled ends of the members so that they can engage to form an L-shaped unit for receiving and storing records.

5 Claims, 7 Drawing Figures

PATENTED DEC 24 1974 3,856,145

RECORD STORAGE RACK

Heretofore there have been various types of record storage devices, and a typical prior art construction is shown in Pat. No. 1,336,382. With the increasing use of records and record players at the present time, the provision of a low cost but sturdy record storage device is needed for storage of a relatively large number of records in a compact area by positioning the records on their edges in a container device.

The general object of the present invention is to provide a novel and improved record storage rack characterized by its production from a pair of substantially identical members, each having a beveled end, slidably interengaged with each other by complementary shaped means formed on the members on their beveled ends.

Another object of the invention is to provide a record storage rack made from molded plastic materials, if desired, and wherein the unit is made from two substantially identically shaped members having support surfaces tilting inwardly and downwardly of the device to facilitate record retention.

Another object of the invention is to provide a record storage device which can be mass produced relatively inexpensively and be assembled at the point of use, and to provide modules of record storage racks that can be secured together in operative relationship with each other to provide a plurality of record storage modules at the point of use.

Another object of the invention is to provide an uncomplicated record storage member that can be shipped in knocked down form and be readily assembled at the point of use without separate attachment means to provide a record storage rack having desirable properties.

The foregoing and other objects and advantages of the invention will be made more apparent as the specification proceeds.

Attention now is particularly directed to the accompanying drawings, wherein.

SUBJECT MATTER OF INVENTION

A record storage rack comprising a pair of members each with an end beveled off at a 45° angle and complementary shaped, slidably engaging securing means provided on the lateral margins of the beveled ends of the said members whereby they can be engaged together by the securing means to form an L-shaped unit having an open center portion for record receiving and storing purposes.

Figures 1, 2, 5:
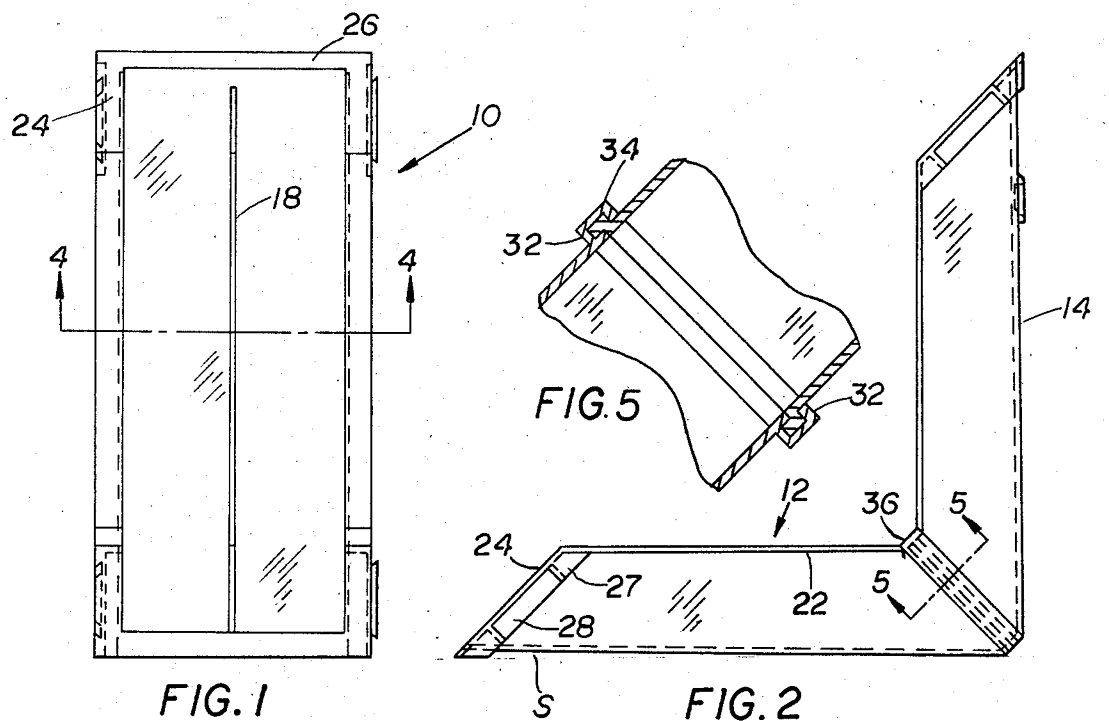
FIG. 1 shows a front elevation of a record storage device embodying the principles of the invention.
FIG. 2 is a right side elevation of the storage rack of FIG. 1.
FIG. 5 is an enlarged section taken on line 5—5 of FIG. 2.
Figure 3:
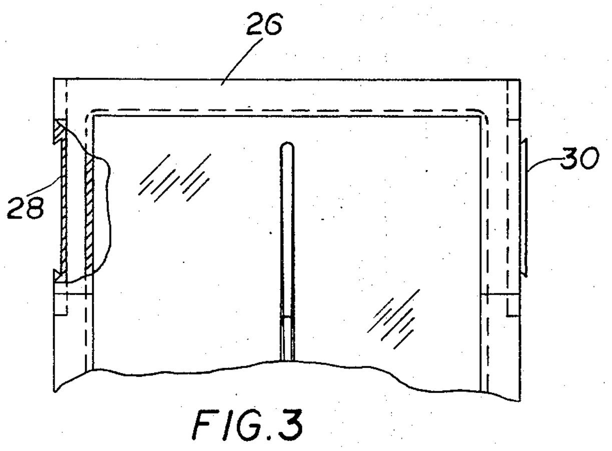
FIG. 3 is a fragmentary enlarged elevation, partially broken away and shown in vertical section, of the upper part of the storage rack of FIG. 1.
Figure 4:
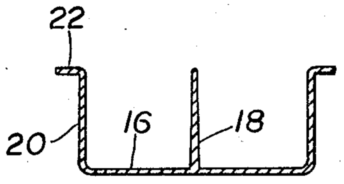
FIG. 4 is a section taken on line 4—4 of FIG. 1.
Figure 6:
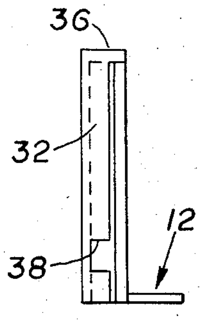
FIG. 6 is a fragmentary end elevation of the female rack components.
Figure 7:
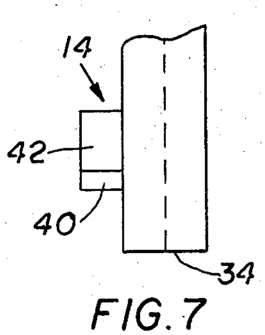
FIG. 7 is a fragmentary enlarged elevation of a portion of the interlocking means on the male rack component.

The accompanying drawings, in detail, show a record storage rack indicated as a whole by the numeral 10. This rack 10 is made from a pair of substantially identical members 12 and 14 with the member 12 being horizontally positioned and the member 14 being upright in the rack as shown in FIG. 2. Each of these members 12 and 14 is of substantially W-shape in section, as indicated in FIG. 4, and with each of the members having a support floor or bottom 16 and usually with one center partition 18 and opposed edges 20 having flanges 22. The partition 18 and its edges 20 can be formed at a slight taper on the inner or face surfaces thereof to facilitate withdrawing the members 12 and 14 from a mold should it be desired to form the members by molding the same from a suitable plastic material. The partition 18 normally terminates short of the end of the member 12 as indicated in FIG. 1.

The free ends of each of the members 12 and 14 preferably are beveled off at angles of substantially 45° to the longitudinal axis of the member, and the flanges 22 on the edges 20 are extended along the beveled ends to extend laterally outwardly thereof, as indicated at 24. Such flanges 24 extend down past the floor 16 of the member a short distance and blend into an inclined support edge 26 formed extending across the free end of each of the members. The drawings show that a dovetailed recess 28 is formed in a short vertical wall 27 extending from the flange 22 to the end of the member. A complementary shaped dovetailed projection 30 is formed on the opposite wall 27 at the free end of each of the members. As the recesses 28 and projections 30 are complementary in size, shape and location in all members of the racks, a plurality of the racks 10 of the invention can be positioned side by side and be engaged with each other by the projection 30 of one rack being seated in the recess 28 of the adjacent rack. Thus a pair of the racks 10 can be secured together at the free ends of the L-shaped rack units.

A further feature of the invention resides in the complementary shaped means, best shown in FIG. 5, used for slidably engaging the two members 12 and 14 to form an operative L-shaped unit therefrom. The member 12 is provided with a female or recessed section 32 at the beveled end of the member 12 engaging the member 14 and this recessed section protrudes laterally beyond and is offset from the main body of the member 12. Such section is complementary to a laterally offset projection or male section 34 formed on the beveled end of the member 14 so that the members can be readily and easily but positively be engaged by sliding the projection 34 of the member 14 into the recess section 32 of the member 12 by bringing the member 12 down to engage the section 32 with the projection 34. A stop flange 36 is formed at the upper inner edge of the member 12 to abut onto the end of the recess section 32 on the member 12 to limit the slidable engagement of the two members 12 and 14 to obtain the desired L-shaped relationship therebetween as shown in the drawings.

To aid in retaining the components of the rack in operative engagement, a slot 38 is formed in the side wall of the recessed section 32. A projection 40 is formed on the side of the male section 34 to engage the slot 38 where the rack components are fully operatively engaged with each other. The projection 40 has an inclined section 42 leading up to an elevated surface terminating in an end shoulder so that the members 12 and 14 can be disengaged when desired by suitably controlled relative movement of the members. The sections 32 and 34 have some slide clearance therebetween so the projection 40 can be moved to operative position.

By providing the support edges 26 on the ends of the members 12 and 14, the rack can be used either in the position as shown, or with the member 14 being the horizontal member and the member 12 being the upright member so that the rack is interchangeable in position. Or the rack can be otherwise positioned, if desired.

It should be noted that FIG. 2 indicates a support surface S for the rack of the invention. By having the edges 26 extend slightly beyond and downwardly of the support floors 16 in the racks, these support floors being positioned at slight acute angles to the horizontal or vertical. Thus, each support floor is inclined downwardly and inwardly of the L-shaped rack to aid in retaining records positioned in the rack safely retained therein.

The units of the invention can be readily made from metal, plastic material or other suitable substances and they can be easily engaged together when the racks are to be made operative. Should additional racks be later added to the initial rack, they can be fixedly engaged therewith by the interlocking complementary shaped projections and recesses 30 and 32 on the adjacent storage racks. Any desired articles such as books, records, business records and/or papers, etc. can be stored in the rack. Hence, it is believed that the objects of the invention have been achieved.

While one complete embodiment of the invention has been disclosed herein, it will be appreciated that modification of this particular embodiment of the invention may be resorted to without departing from the scope of the invention.

What is claimed is:

1. A record storage rack comprising a pair of elongate members having upstanding side walls, the side walls of each member having corresponding ends beveled off at about a 45° angle, and complementary shaped rib and recess securing means formed on the beveled ends of said side walls for interlocking slidable engagement therebetween whereby the members can be engaged by said securing means to form an L-shaped unit for receiving and storing records.

2. A record storage rack as in claim 1 wherein said members are molded plastic parts, a support floor is formed on each of said members, and a support means is formed on each member to extend therefrom from below said support floor at the free end thereof to incline such support floors slightly towards the apex of a said L-shaped unit formed from the members regardless of which member is positioned horizontally to support the rack.

3. A record storage rack as in claim 1 where each of said members and its side walls are of substantially U-shape in vertical cross section, one member is horizontally positioned in the rack when operative, and a support foot is formed on the free end of said one horizontal member to tilt such member slightly for record engaging and retaining action.

4. A record storage rack as in claim 1 where said securing means project laterally from the beveled ends of the side walls of the members, and a stop member is formed at the upper edge of the beveled end of one member to engage the other member to limit the relative sliding engaging action of the securing means when the members have been brought into full beveled end engagement.

5. A storage rack as in claim 1 where said securing means project laterally from the beveled ends of the side walls, and interlocking lug and slot means are formed on corresponding local portions of said securing means for engagement when said members are fully operatively engaged, operative clearance for said interlocking means being provided in said securing means.

* * * * *